US008250323B2

(12) United States Patent
Benhase et al.

(10) Patent No.: US 8,250,323 B2
(45) Date of Patent: Aug. 21, 2012

(54) DETERMINING WHETHER TO USE A REPOSITORY TO STORE DATA UPDATED DURING A RESYNCHRONIZATION

(75) Inventors: Michael Thomas Benhase, Tucson, AZ (US); Shachar Fienblit, Ein Ayala, IL (US); Matthew Joseph Kalos, Tucson, AZ (US); Gail Andrea Spear, Tucson, AZ (US); Sonny Earl Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 11/952,025

(22) Filed: Dec. 6, 2007

(65) Prior Publication Data
US 2009/0150627 A1 Jun. 11, 2009

(51) Int. Cl.
*G06F 12/02* (2006.01)
(52) U.S. Cl. .................. 711/162; 711/E12.002
(58) Field of Classification Search .............. None
See application file for complete search history.

(56) References Cited

U.S. PATENT DOCUMENTS

| 7,039,661 | B1 | 5/2006 | Ranade |
| 7,188,222 | B2 | 3/2007 | Micka et al. |
| 7,203,732 | B2 | 4/2007 | McCabe et al. |
| 2003/0229698 | A1 | 12/2003 | Furuhashi et al. |
| 2004/0260898 | A1 | 12/2004 | Stanley et al. |
| 2005/0010731 | A1* | 1/2005 | Zalewski et al. ............ 711/162 |
| 2005/0071588 | A1* | 3/2005 | Spear et al. ............ 711/162 |
| 2005/0071710 | A1* | 3/2005 | Micka et al. ............ 714/6 |
| 2005/0081091 | A1 | 4/2005 | Bartfai et al. |
| 2005/0193240 | A1 | 9/2005 | Ash et al. |
| 2006/0161810 | A1 | 7/2006 | Bao |
| 2006/0253670 | A1 | 11/2006 | Zohar et al. |
| 2007/0112883 | A1 | 5/2007 | Asano et al. |
| 2007/0124553 | A1 | 5/2007 | Nishimura et al. |
| 2007/0156983 | A1* | 7/2007 | Kern et al. ............ 711/162 |

OTHER PUBLICATIONS

PCT International Search Report and Written Opinion dated May 8, 2009 for Application No. PCT/EP2008/066697 filed Dec. 3, 2008.

* cited by examiner

*Primary Examiner* — Edward Dudek, Jr.
*Assistant Examiner* — Ryan Dare
(74) *Attorney, Agent, or Firm* — David W. Victor; Konrad Raynes & Victor LLP

(57) ABSTRACT

Provided are a method, system, and article of manufacture for determining whether to use a repository to store data updated during a resynchronization. Writes to a primary storage are transferred to a secondary storage. A logical copy of the secondary storage as of a point-in-time is established. Writes to the secondary storage in the logical copy received from the primary storage during a logical copy duration after the point-in-time are stored in a repository that comprises less storage space than the secondary storage in the logical copy. The transferring of writes to the secondary storage is suspended. During the suspension writes to the primary storage are indicated in an out-of-synch data structure. A determination is made as to as to whether available storage space in the repository is sufficient to store writes transferred from the secondary storage while transferring the writes from the out-of-synch data structure in response to ending the suspension of the transferring of writes from the primary to the secondary storages. The repository is used to store data in the secondary storage as of the point-in-time that is to be updated by writes transferred from the primary storage following the ending of the suspension in response to determining that the available storage space in the repository is sufficient to store writes transferred from the secondary storage while transferring the writes indicated in the out-of-synch data structure.

30 Claims, 7 Drawing Sheets

DETERMINING WHETHER TO USE A REPOSITORY TO STORE DATA UPDATED DURING A RESYNCHRONIZATION

BACKGROUND OF THE INVENTION

1. Field of the Invention

The present invention relates to a method, system, and program for determining whether to use a repository to store data updated during a resynchronization.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain data mirroring systems, a timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

One technique to provide a consistent point-in-time copy of data is to suspend all writes to the primary storage and then while writes are suspended copy all the data to mirror to the secondary storage or backup device. A disadvantage of this technique is that host writes are suspended for the time to create a point-in-time copy of data, which may adversely effect application processing at the host. An alternative technique is to establish a logical copy of data at the primary storage target, which takes a very short period of time, such as no more than a second or two. Thus, suspending host writes to the primary storage during the time to establish the logical copy is far less disruptive to host application processing than would occur if host writes were suspended for the time to copy all the source data to the target volume. After establishing the logical copy, source volume data subject to an update is copied to a target volume so that the target volume has the data as of the point-in-time the logical copy was established, before the update. This defers the physical copying until an update is received. This logical copy operation is performed to minimize the time during which the target and source volumes are inaccessible. The point-in-time copy comprises the combination of the data in the source volume and the data to be overwritten by the updates One such logical copy operation is known as FlashCopy® (FlashCopy is a registered trademark of International Business Machines, Corp. or "IBM"). FlashCopy® involves establishing a logical point-in-time copy relationship between primary and secondary volumes on different devices. Once the logical relationship is established, hosts may then have immediate access to data on the primary and secondary volumes, and the data may be copied as part of a background operation. The data is copied from the primary to the secondary volumes as part of a background operation. While the data is being copied over, any reads of data on secondary tracks that have not been copied over cause the data to be copied over from the primary device to the secondary cache so that the secondary target has the copy from the source that existed at the point-in-time of the FlashCopy® operation. Further, any writes to tracks on the primary storage that have not been copied over cause the data to be overwritten on the tracks on the primary storage to be copied to the secondary storage.

To perform the logical copy operation, an entire target volume may be allocated at the secondary storage to store updates to the primary volume, which requires that the same amount of storage space be allocated on the secondary storage for the target volume as is allocated in the primary storage for the source volume. To save space on the secondary storage space, certain space efficient logical copy techniques known in the art allocate a repository to store the data to be overwritten by the updates to the source volume during the logical copy period, where the repository space is substantially less than the full volume size of the source volume because in many cases the data updated on the source volume during the logical copy duration that must be copied to the target is substantially less than the storage space of the full source volume.

In a synchronization environment, a primary storage controller may mirror writes to a primary storage to a secondary storage. A secondary storage controller managing the secondary storage may further make a virtual copy of the secondary storage to form a consistency group so that data in the secondary storage as of a point-in-time is backed up in a repository or a full volume backup.

There is a need in the art for continued improvements to take advantage of space efficient logical copy operations that utilize a repository less in size than the full source volume subject to the logical copy operation.

SUMMARY

Provided are a method, system, and article of manufacture for determining whether to use a repository to store data updated during a resynchronization. Writes to a primary storage are transferred to a secondary storage. A logical copy of the secondary storage as of a point-in-time is established. Writes to the secondary storage in the logical copy received from the primary storage during a logical copy duration after the point-in-time are stored in a repository that comprises less storage space than the secondary storage in the logical copy. The transferring of writes to the secondary storage is suspended. During the suspension writes to the primary storage are indicated in an out-of-synch data structure. A determination is made as to as to whether available storage space in the repository is sufficient to store writes transferred from the secondary storage while transferring the writes from the out-of-synch data structure in response to ending the suspension of the transferring of writes from the primary to the secondary storages. The repository is used to store data in the secondary storage as of the point-in-time that is to be updated by writes transferred from the primary storage following the ending of the suspension in response to determining that the available storage space in the repository is sufficient to store writes transferred from the secondary storage while transferring the writes indicated in the out-of-synch data structure.

In a further embodiment, data from the secondary storage copied prior to the suspension is included in the repository when determining whether the available storage space in the repository is sufficient.

In a further embodiment, the logical copy comprises a first logical copy and the repository comprises a first repository. A second logical copy of the secondary storage is established as of a second-point-in time in response to completing transferring the writes indicated in the out-of-synch data structure to the secondary storage. A second repository for the second logical copy is established. Writes transferred from the primary storage to the secondary storage after a second point-in-time cause the data to be overwritten in the secondary storage to be copied to the repository.

In a further embodiment, writes indicated in the out-of-synch data structure and writes received at the primary storage to the secondary storage after ending the suspension are transferred in response to ending the suspension. Determining whether available storage space in the repository is sufficient to store writes transferred from the secondary storage while transferring the writes indicated in the out-of-synch data structure in response to ending the suspension comprises estimating whether the available storage space in the repository is sufficient to store the writes indicated in the out-of-synch data structure and new writes received at the primary storage while transferring the writes indicated in the out-of-synch data structure.

In a further embodiment, estimating whether the available storage space in the repository is sufficient comprises estimating a time to transfer all the writes indicated in the out-of-synch data structure taking into account a size of the writes indicated in the out-of-synch data structure and a rate at which the new writes are received at the primary storage while transferring all the writes indicated in the out-of-synch data structure after ending the suspension and determining whether the available storage space in the repository is sufficient to store the writes indicated in the out-of-synch data structure and the new writes received during the estimated time.

In a further embodiment, a third storage equal in size to the secondary storage is used to store data in the secondary storage updated after the suspension in response to determining that the available storage space in the repository is not sufficient to store writes transferred from the secondary storage while transferring the writes indicated in the out-of-synch data structure. The third storage additionally stores data copied to the repository before the suspension of the writes.

In a further embodiment, the writes in the repository are copied to the secondary storage. A second virtual copy of the secondary storage to a third storage is established, wherein the third storage is equal in size to the secondary storage, in response to copying the writes from the repository. The primary storage is resyhnchronized to the secondary storage, wherein data in the secondary storage to be overwritten by the data from the primary storage is copied to the third storage.

In a further embodiment, there are a plurality of primary storage and secondary storage pairs. The operations of transferring the writes, establishing the logical copy, and suspending the transferring of writes, and determining whether to use a repository or third storage to store data in the secondary storage updated after the suspension are performed for each primary storage and secondary storage pair.

In a further embodiment, at least one primary storage and secondary storage pair uses the repository for the primary and secondary storage pair and at least one primary storage and secondary storage pair uses the third storage for the primary and secondary storage pair.

Further provided are a method, system, and program that transfers writes to a primary storage to a secondary storage. A logical copy of the secondary storage is established as of a point-in-time. Writes to the secondary storage in the logical copy received from the primary storage during a logical copy duration after the point-in-time are stored in a repository that comprises less storage space than the secondary storage in the logical copy. The transferring of writes to the secondary storage are suspended. During the suspension, writes to the primary storage are indicated in an out-of-synch data structure. The logical copy and the repository are deleted in response to ending the suspension. The writes indicated in the out-of-synch data structure are transferred to the secondary storage in response to deleting the logical copy.

In a further embodiment, the logical copy and the writes are backed-up in the repository to a backup storage in response to ending the suspension. The logical copy and the repository are deleted in response to backing-up the logical copy and the writes in the repository.

DETAILED DESCRIPTION

Figure 1:
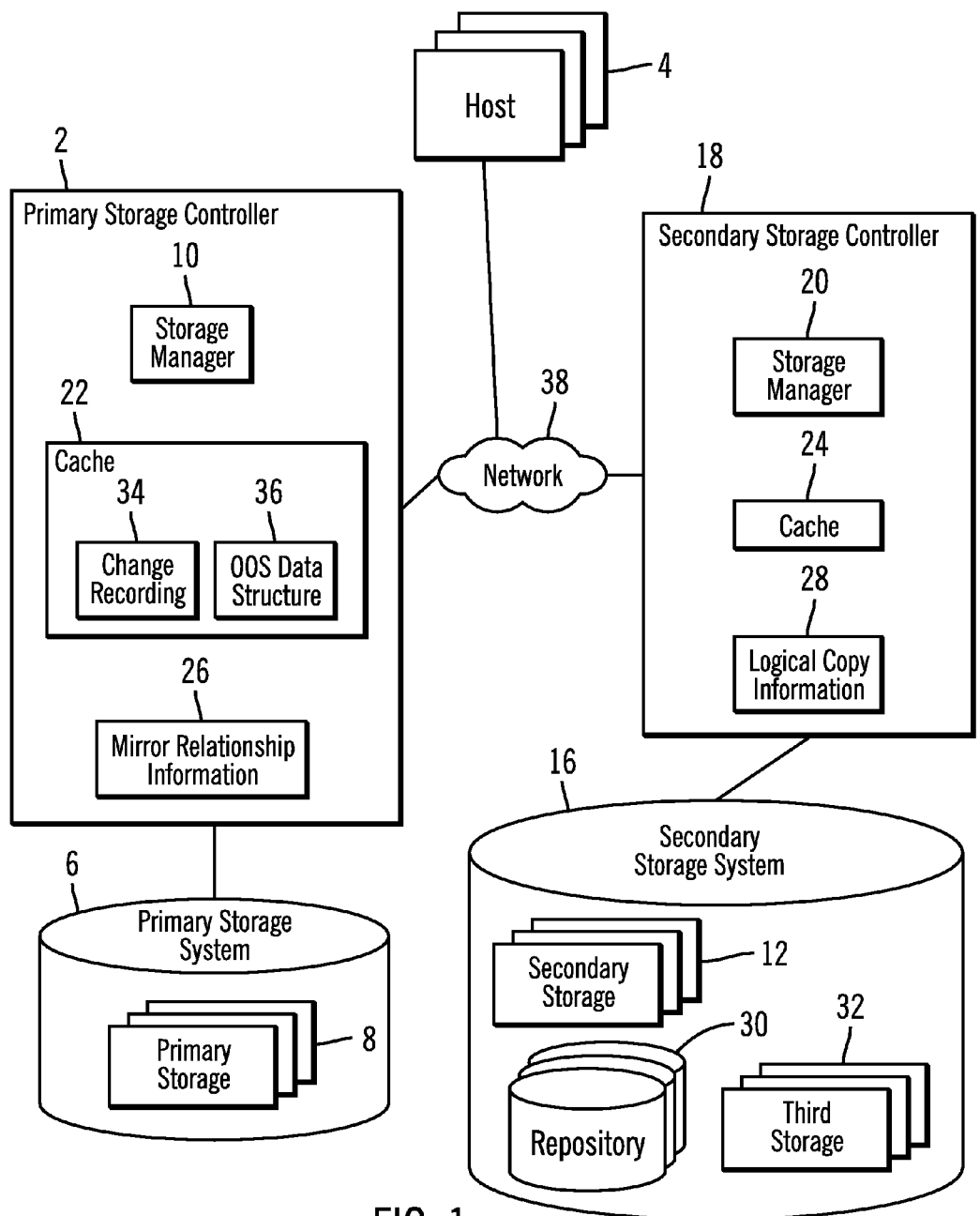
FIGS. 1 and 10 illustrate embodiments of a computing environment.

FIG. 1 illustrates an embodiment of a network computing environment. A primary storage controller 2 manages Input/Output (I/O) requests from one or more host systems 4 to a primary storage system 6 in which primary storages 8, such as volumes, are configured. The primary storage controller 2 includes a primary storage manager 10 program that manages I/O requests to the primary storages 8 and may maintain mirror relationships for primary storages 8, such that updates to primary storages 8 in a mirror relationship are copied to corresponding secondary storages 12, e.g., volumes, in a secondary storage system 16. A secondary storage controller 18 includes a secondary storage manager 20 program to manage I/O access to the secondary storage system 16.

The primary 2 and secondary 18 storage controllers include a cache 22 and 24, respectively, to buffer read and write data to their corresponding storage systems 6 and 16. Both the primary 2 and secondary 18 storage controllers may receive read and write requests from host systems 4. In a further embodiment, writes may be inhibited to the secondary or target storage.

The primary storage manager 10 may maintain mirror relationship information 26 having information on primary storages 6 whose data is mirrored to corresponding secondary storages 12 in the secondary storage system 16. The secondary storage manager 20 maintains logical copy information 28 providing information on logical copies of secondary storages 12, e.g., volumes, whose data as of a point-in-time when the logical copy was created, is maintained in a repository 30 or third storage 32. The third storage 32 is equal in size to the secondary storage 12 subject to the logical copy and includes corresponding tracks or data units for each track or data unit in the secondary storage 12.

The primary storage manager 10 further maintains a change recording data structure 34 and an out-of-synch data structure (OOS) 36. The out-of-synch data structure 36 indicates writes to a primary storage 8 in a mirror relationship to copy to a corresponding secondary storage 12. To form a consistency group, the primary storage controller 2 issues a freeze command. Following the freeze command the data indicated in the out-of-synch data structure (OOS) 36, which is maintained in the cache 22, is copied to the corresponding secondary storage and new writes to the primary storage 8 are indicated in the change recording data structure 34. After draining the OOS 36, i.e., transferring all writes indicated in the OOS 36 to the secondary storage 12, the primary storage controller 2 may form a next consistency group by issuing a new freeze command, making the change recording data structure 32 the OOS 36, and then clearing the OOS 36 to server as the change recording data structure 32 to record new writes that will be transferred as part of the next consistency group.

The primary 2 and secondary 18 storage controllers and host 4 may communicate over a network 38. The network 38 may comprise a Storage Area Network (SAN), Local Area Network (LAN), Intranet, the Internet, Wide Area Network (WAN), peer-to-peer network, wireless network, arbitrated loop network, etc. The storages 6 and 16 may each comprise an array of storage devices, such as a Just a Bunch of Disks (JBOD), Direct Access Storage Device (DASD), Redundant Array of Independent Disks (RAID) array, virtualization device, tape storage, flash memory, etc.

In certain embodiments, storages 8 and 12 in the storage systems 6 and 16 maintained by a storage controller 2, 18 may comprise volumes assigned to one or more sessions. Volumes may be organized in a logical subsystem (LSS), and the volumes in a LSS maintained by a primary storage controller 2 may be assigned to a session.

Figure 2:
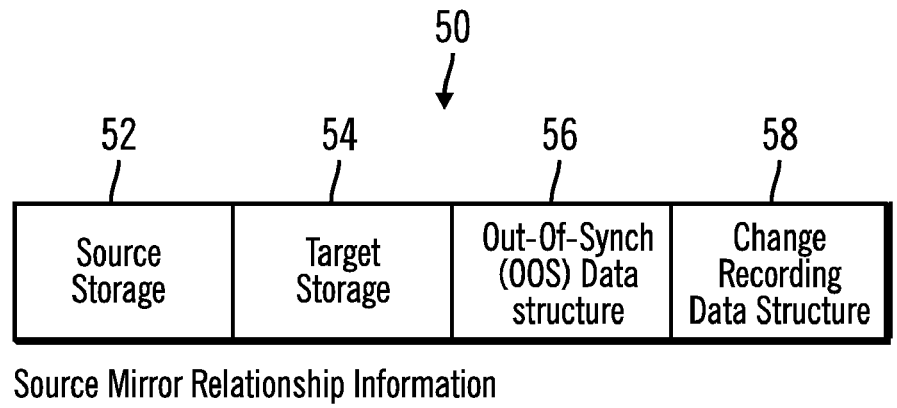
FIG. 2 illustrates an embodiment of source mirror relationship information.

FIG. 2 illustrates an embodiment of source mirror relationship information 50, where the mirror relationship information 26 includes an instance of the source mirror relationship information 50 for each primary storage 8, e.g., volume, and secondary storage 12, e.g., volume, pair in a mirror relationship. The source mirror relationship information 50 indicates: a source storage 52 or primary storage 8 subject to the relationship whose data is copied to an indicated target storage 54, which may comprise a secondary storage 12; an out-of-synch data structure (OOS) 56 identifying writes to the source storage 52 to copy to the target storage 54; and a change recording data structure 58 indicating new writes received to the source storage 52 while draining or transferring writes to the source (primary) storage 52 indicated in the OOS 56 to the target (secondary) storage 54 that are in a consistency group.

Figure 3:
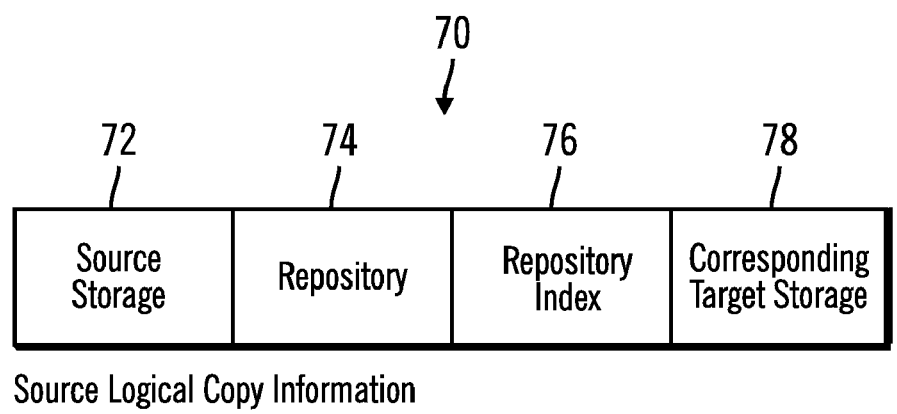
FIG. 3 illustrates an embodiment of volume copy relationship information.

FIG. 3 illustrates an embodiment of source logical copy information 70, where the logical copy information 28 includes an instance of the logical copy information 70 for each secondary storage 12 included in a logical copy relationship, such as a FlashCopy® (FLASHCOPY is a registered trademark of International Business Machines Corp. in the United States and other countries). The logical copy information 70 for one secondary storage 12 indicates a source storage 72 subject to the logical copy relationship. If space efficient logical copy is used, which means less than a full volume is allocated to store the point-in-time data in the source storage 72, e.g., secondary storage 12 volume, subject to an update, then a repository field 74 identifies a repository 30 in the secondary storage system 16 and a repository index 76 indicating where the copied point-in-time data from the source storage 72, e.g., a track or other data unit, is stored in the identified repository 74. If a full target (third) storage 32 equivalent in size to the source storage 72 is used to store the point-in-time data that is updated, then the repository fields 74 and 76 are null and a corresponding target storage field 78 indicates a third storage 32, e.g., volume, allocated as the backup space to store data subject to an update in the source storage 72 during a logical copy duration. With the described embodiments, secondary storages 12 comprising source storages 72 in a logical copy relationships may use either a repository or full storage as the backup space, where different secondary storages 12 may have different types of backup space, e.g., repository or full third storage.

Figure 4:
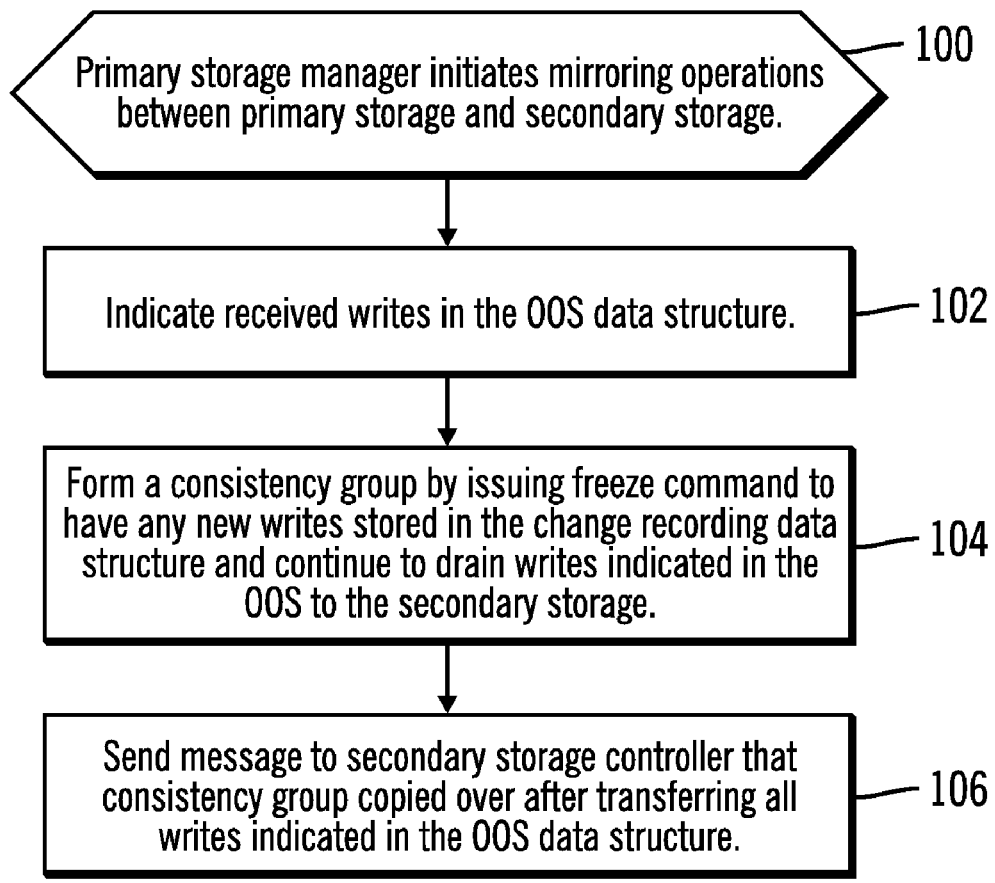
FIG. 4 illustrates an embodiment of operations for a primary storage controller to initiate mirror operations to transfer updates to a primary storage to a secondary storage.

FIG. 4 illustrates an embodiment of operations performed by the primary storage manager 10 to copy writes to a primary storage 8 to a corresponding secondary storage 12 in a mirror relationship 50. Upon the primary storage manager 10 initiating (at block 100) mirroring operations between primary a storage 8 and corresponding secondary storage 12, as indicated in mirror relationship information 50 (FIG. 2), the storage manager 10 indicates (at block 102) writes received from the hosts 4 in the OOS 36. To form a consistency group, the storage manager 10 may issue (at block 104) a freeze command to have any new writes stored in the change recording data structure 34 and continue to drain (i.e., transfer) writes as of the point-in-time of the formed consistency group that are indicated in the OOS 36 to the secondary storage 12. Upon completing the transfer of all writes indicated in the OOS 36, the primary storage manager 10 sends (at block 106) a message to the secondary storage controller 18 indicating that the transfer of a consistency group has completed. At this point, the storage manager 10 may form a new consistency group by issuing a further freeze command and making the current change recording data structure 34 the OOS 36 and clearing the current OOS 36 to make the OOS 36 the change recording data structure 34 to indicate new received writes after the point-in-time of the freeze command forming the new consistency group.

Figure 5:
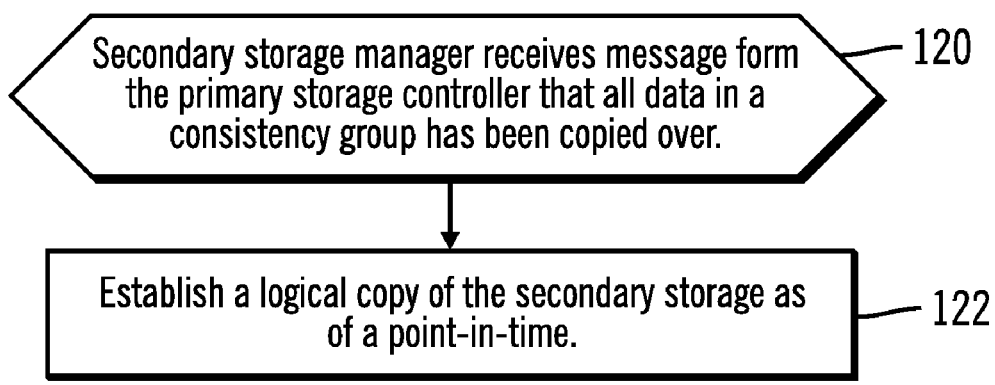
FIG. 5 illustrates an embodiment of operations performed by the secondary storage controller to establish a logical copy of the secondary storage.

FIG. 5 illustrates an embodiment of operations performed by the secondary storage manager 20 to establish a logical copy of the secondary storage 12 involved in a mirror relationship. Upon receiving (at block 120) a message from the primary storage controller 2 that all data in a consistency group has been copied over, i.e., the OOS 36 has been drained, the secondary storage manger 20 establishes (at block 122) a logical copy of the secondary storage 12 as of a point-in-time. Data to be overwritten by writes to the secondary storage 12 in the logical copy received from the primary storage controller 8 during a logical copy duration are stored in a repository 30 that comprises less storage space than the secondary storage 12 in the logical copy.

Figure 6:
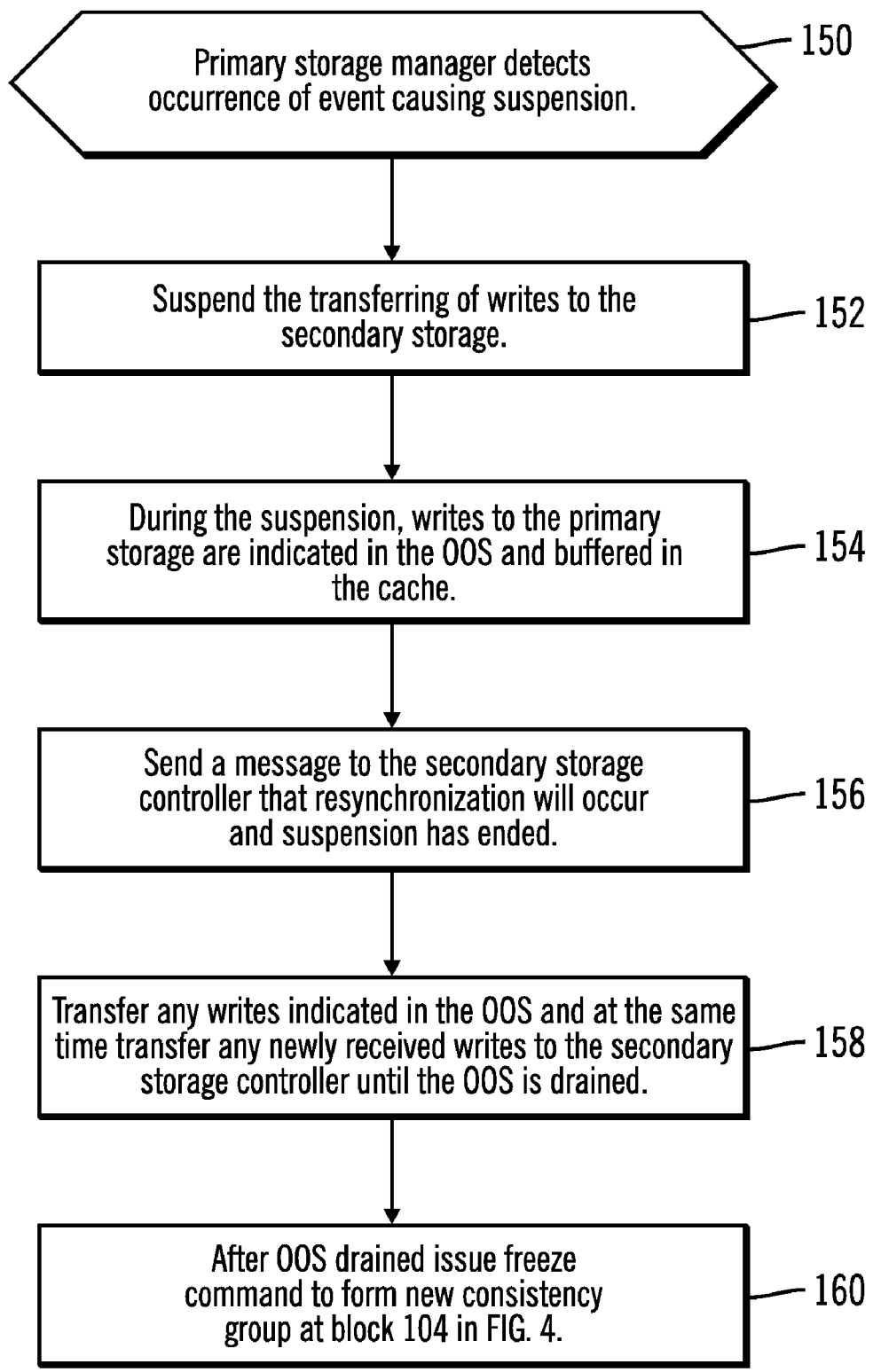
FIG. 6 illustrates an embodiment of operations performed by the primary storage controller to handle an event resulting in the suspension of the transfer of writes in a mirror relationship.

FIG. 6 illustrates an embodiment of operations performed by the storage manager 10 at the primary storage controller 2 to handle an event that causes a suspension of the transfer of writes from a primary storage 8 to a corresponding secondary storage 12 in a mirror relationship, such as a failure in the network 38 connection, etc. Upon detecting (at block 150) the occurrence of a suspension event preventing the transfer of writes from the primary storages 8 to a corresponding secondary storages 12 in mirror relationships, the storage manager 10 suspends (at block 152) the transfer of writes to the secondary storage 16. During the suspension, the storage manager 10 indicates (at block 154) new writes to the primary storage 8 in the mirror relationship to the OOS 36 and buffers the writes to the primary storage 8. Thus, the OOS 36 indicates writes received to the primary storage 8 prior to the suspension and during the suspension. Upon detecting that the suspension has ended, the storage manager 10 sends (at block 156) a message to the secondary storage controller 18 indicating a resynchronization of writes following suspension will occur. The primary storage manager 10 then transfers (at block 158) any writes indicated in the OOS 36 and at the same time to transfers any newly received writes to the secondary storage controller 18 for the corresponding secondary storage 8 until the OOS 36 is drained, i.e., all writes indicated in the OOS 36 are transferred to the secondary storage 12. After the OOS 36 is drained as part of the resynchronization, the primary storage manager 10 may issue (at block 160) a freeze command to form a new consistency group at block 104 in FIG. 4.

Figure 7:
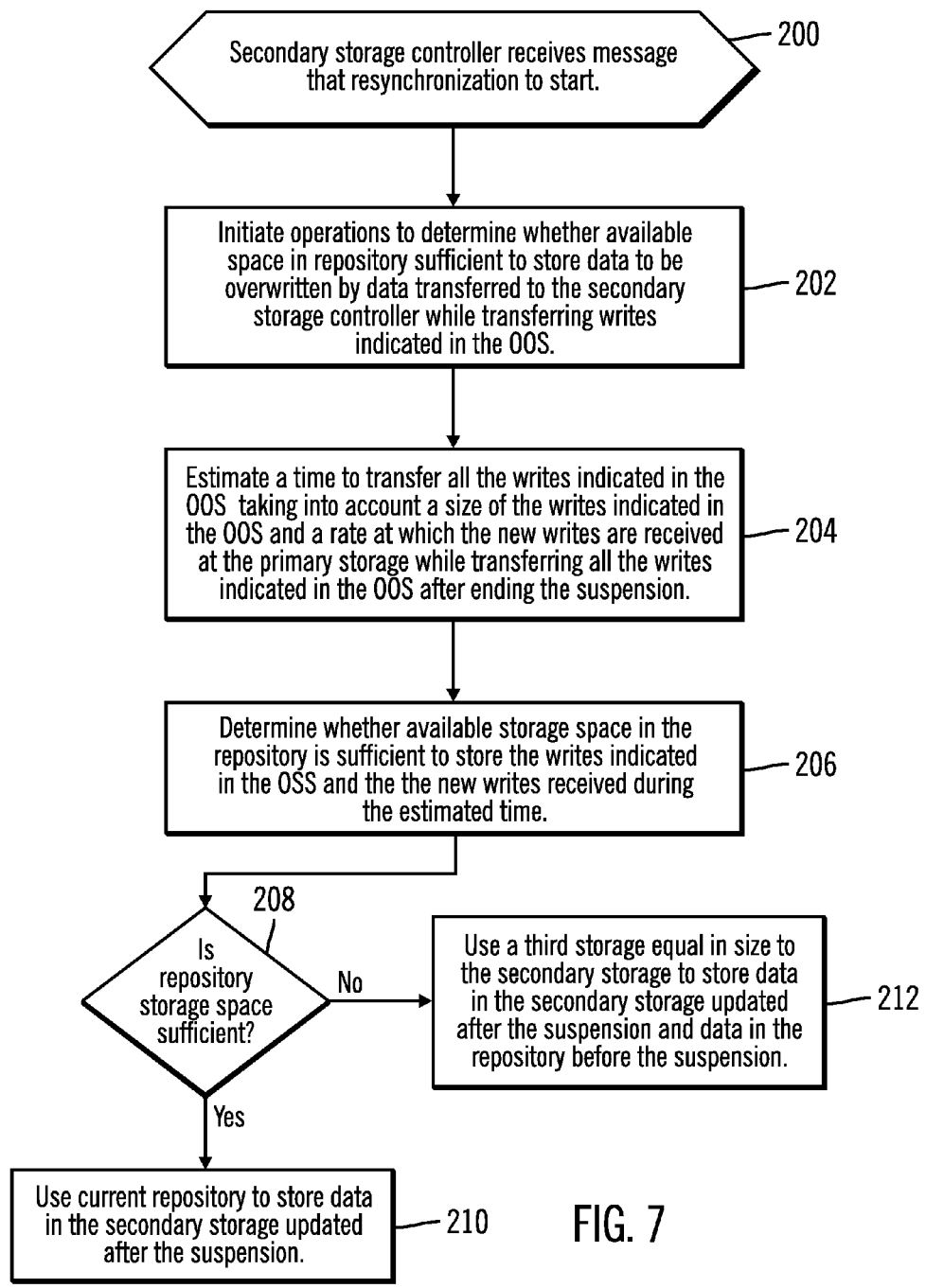
FIGS. 7 and 9 illustrate embodiments of operations performed by the secondary storage controller to handle a resynchronization message indicating a resynchronization of writes from a primary storage to a secondary storage.

FIG. 7 illustrates an embodiment of operations performed by the secondary storage manager 20 in response to the resynchronization of writes initiated by the primary storage controller 2 for a primary storage 8/secondary storage 12 pair. In response (at block 200) to the resynchronization message, the secondary storage manger 20 initiates (at block 202) operations to determine whether there is available space in the repository 30 to store data to be overwritten by data transferred to the secondary storage controller while transferring writes indicated in the OOS. In one embodiment, the secondary storage manager 20 may perform the operations at blocks 204 and 206 to determine whether the current repository 30 has sufficient available storage space to store data in the secondary storage 12 updated by writes transferred from the primary storage controller 2 in the mirror relationship.

At block 204, the secondary storage manager 20 estimates a time to transfer all the writes indicated in the out-of-synch data structure (OOS) 36 taking into account a size of the writes indicated in the OOS 36 and a rate at which the new writes are received at the primary storage 8 while transferring all the writes indicated in the OOS 36 after ending the suspension. As discussed, during resynchronization, both writes indicated in the OOS 36 that occurred during the suspension and writes that are received while the OOS 36 is being drained are transferred to the secondary storage 12. The secondary storage manager 20 then determines (at block 206) whether available storage space in the repository 30 is sufficient to store the writes indicated in the OOS 36 and the new writes received during the estimated time.

In one embodiment, the secondary storage manager 20 may estimate whether the repository 30 has sufficient available storage space to store writes transferred while the writes indicated in the OOS 36 are being drained to the secondary storage 30 by considering the following variables:

FS—the available free space in the repository 30, where the repository 30 may have data, e.g., tracks, in the secondary storage 12, copied before the suspension.

SR—synchronization rate, which is the rate (e.g., tracks per second) at which writes to the primary storage 8 are transferred to the secondary storage controller 18 over the network 38.

WB—write backlog comprising the size, e.g., kilobytes, of writes indicated in the OOS 36 accumulated before and during the suspension to transfer to the secondary storage 12 during resynchronization.

NWR—new write rate comprising the rate (e.g., tracks per second) at which new writes are received at the primary storage controller 2 for the primary storage 8.

The above variables may be used to estimate the amount of data that will be transferred to the repository 30 while the OOS 36 is being drained. First the aggregate rate at which the OOS 36 is drained is estimated, which comprises the SR minus the NWR, because the rate at which writes are transferred is reduced by the rate at which new writes are received, i.e., offset the transfer rate. The storage manager 20 may then calculate the time to drain the OOS 36 (variable "T") as WB divided by the aggregate rate, which is the time to transfer all writes indicated in the OOS 36 taking into account the extent that new writes will offset this transfer of writes indicated in the OOS 36. The total amount of data, e.g., bytes, transferred while the OOS 36 is being drained may be calculated by adding the write backlog (WB), i.e., writes in the OOS 36, to the new write rate (NWR) times the aggregate time to transfer all writes indicated in the OOS 36. The available storage space in the repository 30 (FS) may then be compared to the estimated total amount of data transferred, i.e., is FS>(WB 30 NWR*T).

If (at block 208) the repository 30 has sufficient available storage space to store the writes transferred while the OOS 36 is being drained, then the secondary storage manager 20 uses (at block 210) the current repository 30 to store data in the secondary storage 12 updated after the suspension. Otherwise, if the repository 30 does not have sufficient space, then the secondary storage manager 20 uses (at block 212) a third storage 32 equal in size to the secondary storage 12 to store data in the secondary storage updated by new writes from the primary storage controller 20 received after the suspension and data in the repository 30 before the suspension.

Figure 8:
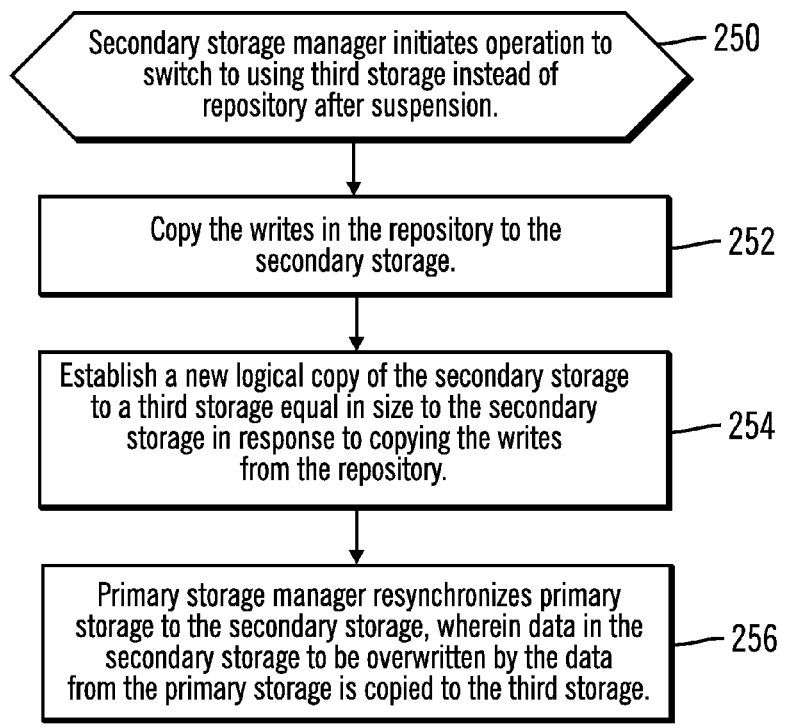
FIG. 8 illustrates an embodiment of operations performed by the secondary storage controller to switch to using a third storage instead of a repository less in size than the third storage to store data in the secondary storage subject to an update.

FIG. 8 illustrates an embodiment of operations performed by the secondary storage manager 20 to switch to using the third storage 32 to store data in the secondary storage 12 updated during the synchronization if the repository 30 is estimated not to have sufficient available space to store the data updated by the estimated writes, such as at block 208 in FIG. 7. In response to initiating operations to switch to using the third storage 32 (at block 250), the secondary storage manager 20 copies (at block 252) the writes in the repository 30 to the secondary storage 12. The secondary storage manager 20 establishes (at block 254) a new logical copy of the secondary storage 12 to a third storage 32 equal in size to the secondary storage 32 in response to copying the writes from the repository 30. The primary storage manger 10 then resynchronizes (at block 256) the primary storage 8 to the secondary storage 12, wherein data in the secondary storage 12 to be overwritten by the data from the primary storage is copied to the third storage 32.

Figure 9:
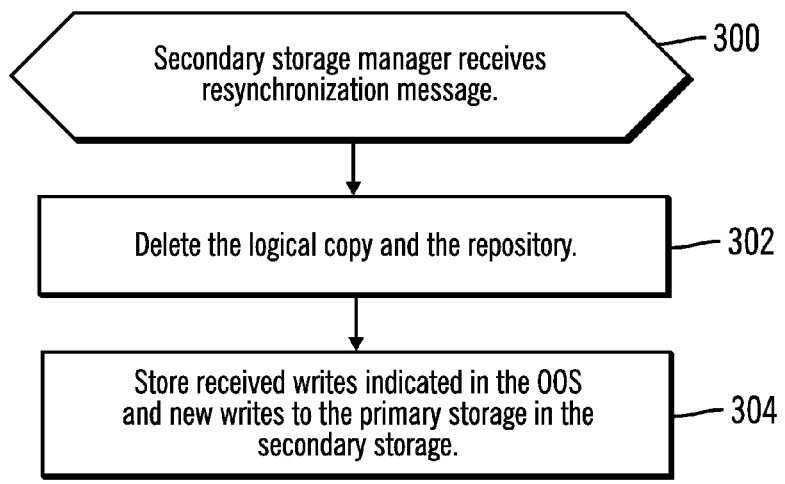

FIG. 9 illustrates an alternative embodiment of operations performed by the secondary storage manager 20 to handle a resynchronization following a suspension. Upon receiving (at block 300) the resynchronization message from the primary storage controller 2, the secondary storage manager 20 deletes (at block 302) the logical copy and repository 30 for the secondary storage 8 subject to the resynchronization request. Writes transferred during the resynchronization (including writes indicated in the OOS 36 and new writes to the primary storage 8) are stored (at block 306) in the secondary storage. With the embodiment of FIG. 9, the system does not have a backup protection of the writes to the secondary storage 12, because a logical copy is not used to protect the data at the secondary storage 12 being updated during the resynchronization.

In an alternative embodiment of the operations of FIG. 9, before deleting the logical copy and the repository (at block 302), the logical copy and writes in the repository 32 for the logical copy may be backed-up. Further, the logical copy and writes may be deleted after backing up the logical copy and repository.

Figure 10:
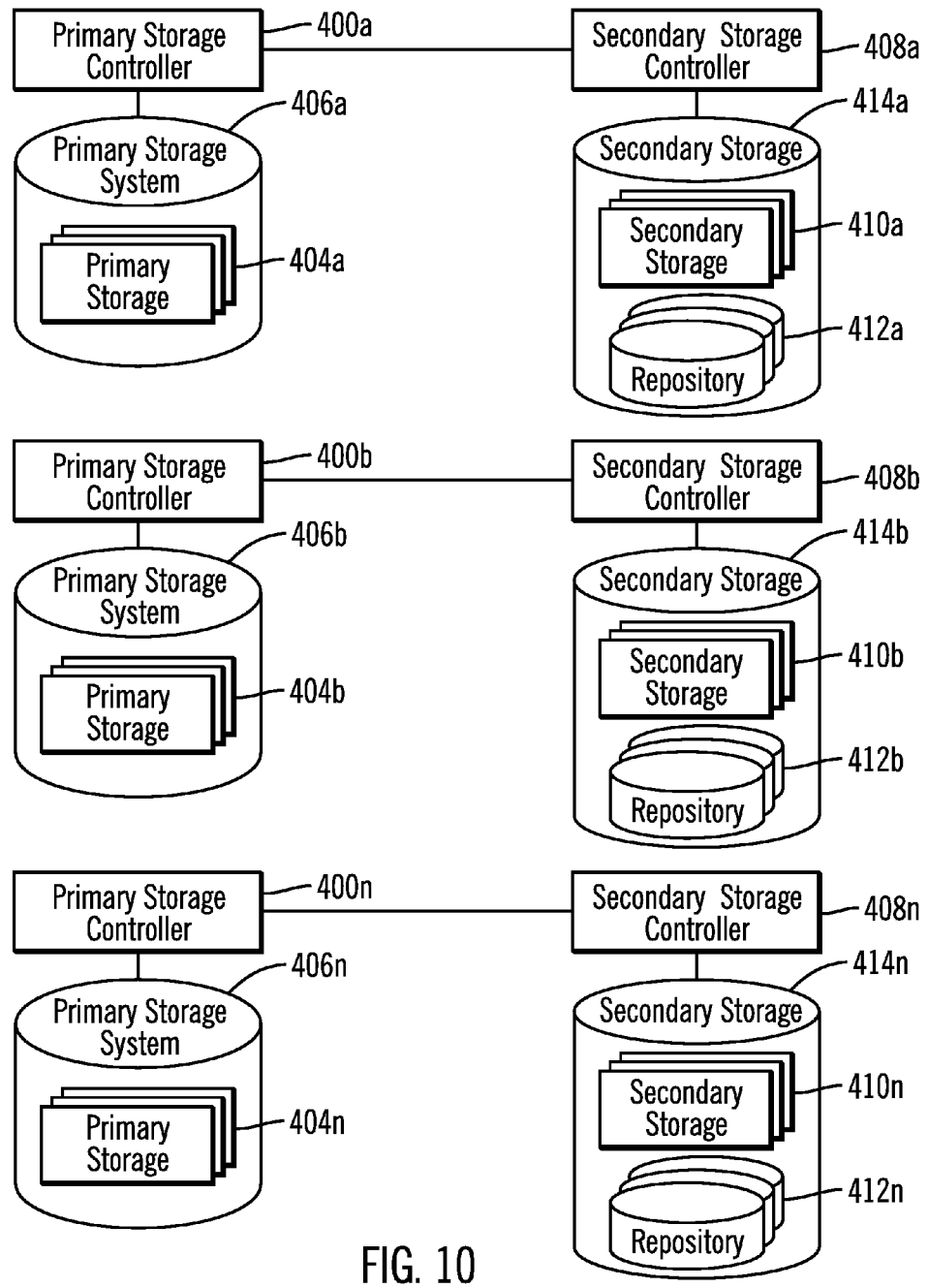

FIG. 10 illustrates an embodiment where a plurality of primary storage controllers 400a, 400b . . . 400n managing access to primary storages systems 402a, 402b . . . 402n and copy writes to primary storages 404a, 404b . . . 404n, e.g., volumes, that are in a mirror relationship to a corresponding secondary storage controller 408a, 408b . . . 408n to store in a secondary storage 410a, 410b . . . 410n. The primary storages 404a, 404b . . . 404n may be in a same consistency group, such that all the data is consistent as of a same point-in-time. The primary storage controllers 400a, 400b . . . 400n and secondary storage controllers 408a, 408b . . . 408n may comprise instances of the primary storage controller 2 of FIG. 1 and the secondary storage controllers 408a, 408b . . . 408n may comprise instances of the secondary storage controller 18 of FIG. 1, respectively.

The secondary storage controllers 408a, 408b . . . 408n in a global consistency group may independently perform the operations of the secondary storage controller 18, described with respect to FIGS. 5, 6, 7, and 8 with respect to synchronization and resynchronization of writes from their respective primary storage controllers 400a, 400b . . . 400n.

Described embodiments provide techniques to determine whether a space efficient repository may be used to store secondary storage data updated during a resynchronization event when writes received at the primary storage during synchronization and writes received during the resynchronization are transferred to the secondary storage.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the secondary storage manager 20 performed the operations to determine whether to continue using the current repository 30 for secondary storage 12 data updated during resynchronization. In an alternative embodiment, the primary storage manager 10 may perform the operations to determine whether to continue using the repository 30 for updates received at the secondary storage 12 during the resynchronization and then instruct the secondary storage manager 20 to continue using the current repository 30 or to switch to using a full third storage 32 to store point-in-time secondary storage 12 data updated during the resynchronization.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    transferring writes to a primary storage to a secondary storage in a mirror copy relationship;
    establishing a logical copy of the secondary storage as of a point-in-time;
    storing writes to data in the logical copy, received from the primary storage during a logical copy duration after the point-in-time, in a repository that comprises less storage space than the secondary storage;
    suspending the transferring of writes to the secondary storage, wherein during the suspension writes to the primary storage are indicated in an out-of-synch data structure;
    in response to ending the suspension of the transferring of writes from the primary to the secondary storages, determining whether available storage space in the repository is sufficient to store writes transferred from the primary storage while transferring the writes from the out-of-synch data structure; and
    using the repository to store data in the secondary storage as of the point-in-time that is to be updated by writes transferred from the primary storage following the ending of the suspension in response to determining that the available storage space in the repository is sufficient to store writes transferred from the primary storage while transferring the writes indicated in the out-of-synch data structure.

2. The method of claim 1, wherein data from the secondary storage copied from the primary storage prior to the suspension is included in the repository when determining whether the available storage space in the repository is sufficient.

3. The method of claim 1, wherein the logical copy comprises a first logical copy and the repository comprises a first repository, further comprising:
    establishing a second logical copy of the secondary storage as of a second-point-in time in response to completing transferring the writes indicated in the out-of-synch data structure to the secondary storage;
    establishing a second repository for the second logical copy, wherein writes transferred from the primary storage to the secondary storage after a second point-in-time cause the data to be overwritten in the secondary storage to be copied to the repository.

4. The method of claim 1, further comprising:
    transferring writes indicated in the out-of-synch data structure and writes received at the primary storage to the secondary storage after ending the suspension in response to ending the suspension, and wherein determining whether available storage space in the repository is sufficient to store writes transferred from the secondary storage while transferring the writes indicated in the out-of-synch data structure in response to ending the suspension comprises estimating whether the available storage space in the repository is sufficient to store the writes indicated in the out-of-synch data structure and new writes received at the primary storage while transferring the writes indicated in the out-of-synch data structure.

5. The method of claim 4, wherein estimating whether the available storage space in the repository is sufficient comprises:
    estimating a time to transfer all the writes indicated in the out-of-synch data structure taking into account a size of the writes indicated in the out-of-synch data structure and a rate at which the new writes are received at the primary storage while transferring all the writes indicated in the out-of-synch data structure after ending the suspension; and
    determining whether the available storage space in the repository is sufficient to store the writes indicated in the out-of-synch data structure and the new writes received during the estimated time.

6. The method of claim 1, further comprising:
    using a third storage equal in size to the secondary storage to store writes transferred from the primary storage to the secondary storage after the suspension in response to determining that the available storage space in the repository is not sufficient to store writes transferred from the secondary storage while transferring the writes indicated in the out-of-synch data structure, wherein the third storage additionally stores data copied to the repository before the suspension of the writes.

7. The method of claim 1, further comprising:
    copying the writes in the repository to the secondary storage;

establishing a second virtual copy of the secondary storage to a third storage, wherein the third storage is equal in size to the secondary storage, in response to copying the writes from the repository; and resynchronizing the primary storage to the secondary storage, wherein data in the secondary storage to be overwritten by the data from the primary storage is copied to the third storage.

8. The method of claim 6, wherein there are a plurality of primary storage and secondary storage pairs, wherein the operations of transferring the writes, establishing the logical copy, suspending the transferring of writes, and determining whether to use a repository or third storage to store data in the secondary storage updated after the suspension are performed for each primary storage and secondary storage pair.

9. The method of claim 8, wherein at least one primary storage and secondary storage pair uses the repository for the primary and secondary storage pair and at least one primary storage and secondary storage pair uses the third storage for the primary and secondary storage pair.

10. A method, comprising:

transferring writes to a primary storage to a secondary storage in a mirror copy relationship;

establishing a logical copy of the secondary storage as of a point-in-time;

storing writes to data in the logical copy, received from the primary storage during a logical copy duration after the point-in-time, in a repository that comprises less storage space than the secondary storage;

suspending the transferring of writes to the secondary storage, wherein during the suspension writes to the primary storage are indicated in an out-of-synch data structure;

backing up the logical copy and the writes in the repository to a backup storage in response to ending the suspension;

deleting the logical copy and the repository in response to backing-up the logical copy and the writes in the repository following the ending of the suspension; and transferring the writes indicated in the out-of-synch data structure to the secondary storage in response to deleting the logical copy.

11. The method of claim 1, further comprising:

using a third storage to store data in the secondary storage as of the point-in-time that is to be updated by writes transferred from the primary storage following the ending of the suspension in response to determining that the available storage space in the repository is not sufficient to store writes transferred from the primary storage while transferring the writes indicated in the out-of-synch data structure.

12. A system in communication with a primary storage and a secondary storage, comprising:

a plurality of storage controllers;

computer readable storage mediums including code executed by the storage controllers to perform operations, the operations comprising:

transferring writes to the primary storage to the secondary storage in a mirror copy relationship;

establishing a logical copy of the secondary storage as of a point-in-time;

storing writes to data in the logical copy, received from the primary storage during a logical copy duration after the point-in-time, in a repository that comprises less storage space than the secondary storage;

suspending the transferring of writes to the secondary storage, wherein during the suspension writes to the primary storage are indicated in an out-of-synch data structure;

in response to ending the suspension of the transferring of writes from the primary to the secondary storages, determining whether available storage space in the repository is sufficient to store writes transferred from the primary storage while transferring the writes from the out-of-synch data structure; and using the repository to store data in the secondary storage as of the point-in-time that is to be updated by writes transferred from the primary storage following the ending of the suspension in response to determining that the available storage space in the repository is sufficient to store writes transferred from the primary storage while transferring the writes indicated in the out-of-synch data structure.

13. The system of claim 12, wherein data from the secondary storage copied from the primary storage prior to the suspension is included in the repository when determining whether the available storage space in the repository is sufficient.

14. The system of claim 12, wherein the operations further comprise:

transferring writes indicated in the out-of-synch data structure and writes received at the primary storage to the secondary storage after ending the suspension in response to ending the suspension, and wherein determining whether available storage space in the repository is sufficient to store writes transferred from the secondary storage while transferring the writes indicated in the out-of-synch data structure in response to ending the suspension comprises estimating whether the available storage space in the repository is sufficient to store the writes indicated in the out-of-synch data structure and new writes received at the primary storage while transferring the writes indicated in the out-of-synch data structure.

15. The system of claim 14, wherein estimating whether the available storage space in the repository is sufficient comprises:

estimating a time to transfer all the writes indicated in the out-of-synch data structure taking into account a size of the writes indicated in the out-of-synch data structure and a rate at which the new writes are received at the primary storage while transferring all the writes indicated in the out-of-synch data structure after ending the suspension; and determining whether the available storage space in the repository is sufficient to store the writes indicated in the out-of-synch data structure and the new writes received during the estimated time.

16. The system of claim 12 further in communication with a third storage equal in size to the secondary storage, wherein the operations further comprise:

using the third storage to store writes transferred from the primary storage to the secondary storage after the suspension in response to determining that the available storage space in the repository is not sufficient to store writes transferred from the secondary storage while transferring the writes indicated in the out-of-synch data structure, wherein the third storage additionally stores data copied to the repository before the suspension of the writes.

17. The system of claim 12, wherein the operations further comprise:

copying the writes in the repository to the secondary storage;

establishing a second virtual copy of the secondary storage to a third storage, wherein the third storage is equal in size to the secondary storage, in response to copying the writes from the repository; and resynchronizing the primary storage to the secondary storage, wherein data in the secondary storage to be overwritten by the data from the primary storage is copied to the third storage.

18. A system in communication with a primary storage, a secondary storage, and a backup storage, comprising:

a plurality of storage controllers;

computer readable storage mediums including code executed by the storage controllers to perform operations, the operations comprising:

transferring writes to the primary storage to the secondary storage in a mirror copy relationship;

establishing a logical copy of the secondary storage as of a point-in-time;

storing writes to data in the logical copy, received from the primary storage during a logical copy duration after the point-in-time, in a repository that comprises less storage space than the secondary storage;

suspending the transferring of writes to the secondary storage, wherein during the suspension writes to the primary storage are indicated in an out-of-synch data structure;

backing up the logical copy and the writes in the repository to the backup storage in response to ending the suspension;

deleting the logical copy and the repository in response to backing-up the logical copy and the writes in the repository following the ending of the suspension;

transferring the writes indicated in the out-of-synch data structure to the secondary storage in response to deleting the logical copy.

19. The system of claim 12, further comprising:

using a third storage to store data in the secondary storage as of the point-in-time that is to be updated by writes transferred from the primary storage following the ending of the suspension in response to determining that the available storage space in the repository is not sufficient to store writes transferred from the primary storage while transferring the writes indicated in the out-of-synch data structure.

20. An article of manufacture comprising at least one of a hardware device having logic and a computer readable storage medium having code to communicate with a primary and secondary storage and to perform operations, the operations comprising:

transferring writes to a primary storage to a secondary storage in a mirror copy relationship;

establishing a logical copy of the secondary storage as of a point-in-time;

storing writes to data in the logical copy, received from the primary storage during a logical copy duration after the point-in-time, in a repository that comprises less storage space than the secondary storage;

suspending the transferring of writes to the secondary storage, wherein during the suspension writes to the primary storage are indicated in an out-of-synch data structure;

in response to ending the suspension of the transferring of writes from the primary to the secondary storages, determining whether available storage space in the repository is sufficient to store writes transferred from the primary storage while transferring the writes from the out-of-synch data structure; and using the repository to store data in the secondary storage as of the point-in-time that is to be updated by writes transferred from the primary storage following the ending of the suspension in response to determining that the available storage space in the repository is sufficient to store writes transferred from the primary storage while transferring the writes indicated in the out-of-synch data structure.

21. The article of manufacture of claim 20, wherein data from the secondary storage copied from the primary storage prior to the suspension is included in the repository when determining whether the available storage space in the repository is sufficient.

22. The article of manufacture of claim 20, wherein the logical copy comprises a first logical copy and the repository comprises a first repository, wherein the operations further comprise:

establishing a second logical copy of the secondary storage as of a second-point-in time in response to completing transferring the writes indicated in the out-of-synch data structure to the secondary storage;

establishing a second repository for the second logical copy, wherein writes transferred from the primary storage to the secondary storage after a second point-in-time cause the data to be overwritten in the secondary storage to be copied to the repository.

23. The article of manufacture of claim 20, wherein the operations further comprise:

transferring writes indicated in the out-of-synch data structure and writes received at the primary storage to the secondary storage after ending the suspension in response to ending the suspension, and wherein determining whether available storage space in the repository is sufficient to store writes transferred from the secondary storage while transferring the writes indicated in the out-of-synch data structure in response to ending the suspension comprises estimating whether the available storage space in the repository is sufficient to store the writes indicated in the out-of-synch data structure and new writes received at the primary storage while transferring the writes indicated in the out-of-synch data structure.

24. The article of manufacture of claim 23, wherein estimating whether the available storage space in the repository is sufficient comprises:

estimating a time to transfer all the writes indicated in the out-of-synch data structure taking into account a size of the writes indicated in the out-of-synch data structure and a rate at which the new writes are received at the primary storage while transferring all the writes indicated in the out-of-synch data structure after ending the suspension; and determining whether the available storage space in the repository is sufficient to store the writes indicated in the out-of-synch data structure and the new writes received during the estimated time.

25. The article of manufacture of claim 20, wherein the operations further comprise:

using a third storage equal in size to the secondary storage to store writes transferred from the primary storage to the secondary storage after the suspension in response to determining that the available storage space in the repository is not sufficient to store writes transferred from the secondary storage while transferring the writes indicated in the out-of-synch data structure, wherein the third storage additionally stores data copied to the repository before the suspension of the writes.

26. The article of manufacture of claim 20, wherein the operations further comprise:

copying the writes in the repository to the secondary storage;

establishing a second virtual copy of the secondary storage to a third storage, wherein the third storage is equal in size to the secondary storage, in response to copying the writes from the repository; and resynchronizing the primary storage to the secondary storage, wherein data in the secondary storage to be overwritten by the data from the primary storage is copied to the third storage.

27. The article of manufacture of claim 25, wherein there are a plurality of primary storage and secondary storage pairs, wherein the operations of transferring the writes, establishing the logical copy, suspending the transferring of writes, and determining whether to use a repository or third storage to store data in the secondary storage updated after the suspension are performed for each primary storage and secondary storage pair.

28. The article of manufacture of claim 27, wherein at least one primary storage and secondary storage pair uses the repository for the primary and secondary storage pair and at least one primary storage and secondary storage pair uses the third storage for the primary and secondary storage pair.

29. The article of manufacture of claim 20, wherein the operations further comprise:

using a third storage to store data in the secondary storage as of the point-in-time that is to be updated by writes transferred from the primary storage following the ending of the suspension in response to determining that the available storage space in the repository is not sufficient to store writes transferred from the primary storage while transferring the writes indicated in the out-of-synch data structure.

30. An article of manufacture comprising at least one of a hardware device having logic and a computer readable storage medium having code to communicate with a primary storage, a secondary storage, and a backup storage, and to perform operations, wherein the operations further comprise:

transferring writes to a primary storage to a secondary storage in a mirror copy relationship;

establishing a logical copy of the secondary storage as of a point-in-time;

storing writes to data in the logical copy, received from the primary storage during a logical copy duration after the point-in-time, in a repository that comprises less storage space than the secondary storage;

suspending the transferring of writes to the secondary storage, wherein during the suspension writes to the primary storage are indicated in an out-of-synch data structure;

backing up the logical copy and the writes in the repository to the backup storage in response to ending the suspension;

deleting the logical copy and the repository in response to backing-up the logical copy and the writes in the repository following the ending of the suspension; and transferring the writes indicated in the out-of-synch data structure to the secondary storage in response to deleting the logical copy.

\* \* \* \* \*